United States Patent
Zobel

(10) Patent No.: US 9,436,879 B2
(45) Date of Patent: Sep. 6, 2016

(54) METHOD FOR RECOGNIZING TRAFFIC SIGNS

(75) Inventor: Matthias Zobel, Wasserburg (DE)

(73) Assignee: Conti Temic microelectronic GmbH, Nuernberg (DE)

( * ) Notice: Subject to any disclaimer, the term of this patent is extended or adjusted under 35 U.S.C. 154(b) by 0 days.

(21) Appl. No.: 14/126,098

(22) PCT Filed: Jul. 10, 2012

(86) PCT No.: PCT/DE2012/100208
§ 371 (c)(1),
(2), (4) Date: Dec. 13, 2013

(87) PCT Pub. No.: WO2013/017125
PCT Pub. Date: Feb. 7, 2013

(65) Prior Publication Data
US 2014/0119605 A1    May 1, 2014

(30) Foreign Application Priority Data
Aug. 4, 2011 (DE) .......... 10 2011 109 387

(51) Int. Cl.
*G06K 9/00* (2006.01)
*G08G 1/0962* (2006.01)

(52) U.S. Cl.
CPC ....... *G06K 9/00818* (2013.01); *G06K 9/00536* (2013.01); *G08G 1/09623* (2013.01)

(58) Field of Classification Search
None
See application file for complete search history.

(56) References Cited

U.S. PATENT DOCUMENTS

| 4,566,124 A | 1/1986 | Yamamoto et al. |
| 4,901,362 A | 2/1990 | Terzian |
| 5,594,806 A | 1/1997 | Colbert |
| 6,208,758 B1 | 3/2001 | Ono et al. |
| 6,690,842 B1 | 2/2004 | Silver et al. |
| 6,801,638 B1 | 10/2004 | Janssen et al. |
| 6,842,177 B2 | 1/2005 | Garg et al. |
| 6,888,892 B2 | 5/2005 | Chung et al. |
| 7,034,848 B2 | 4/2006 | Sobol |

(Continued)

FOREIGN PATENT DOCUMENTS

| DE | 198 52 631 | 5/2000 |
| DE | 199 38 256 | 2/2001 |

(Continued)

OTHER PUBLICATIONS

PCT Examiner Sebastian Streich, International Search Report of the International Searching Authority for International Application PCT/DE2012/100208, mailed Nov. 20, 2012, 3 pages, European Patent Office, HV Rijswijk, Netherlands.

(Continued)

*Primary Examiner* — Vikkram Bali
*Assistant Examiner* — Tracy Mangialaschi
(74) *Attorney, Agent, or Firm* — W. F. Fasse

(57) ABSTRACT

For recognizing traffic signs that include a main sign and an associated additional sign, a method involves using a camera to record image data of an environment outside a vehicle, evaluating the image data to detect the presence and the class of the main sign and to detect the presence and partially classify the content of the additional sign by pattern recognition, performing text recognition to read and interpret text of the additional sign, and comparing the recognized text with actual current situational information to determine whether the main sign is currently applicable.

19 Claims, 1 Drawing Sheet

(56) References Cited

U.S. PATENT DOCUMENTS

| | | |
|---|---|---|
| 7,058,206 B1 | 6/2006 | Janssen et al. |
| 7,209,141 B2 | 4/2007 | Garg et al. |
| 7,346,222 B2 | 3/2008 | Lee et al. |
| 7,466,841 B2 | 12/2008 | Bahlmann et al. |
| 8,064,643 B2 | 11/2011 | Stein et al. |
| 8,170,340 B2 | 5/2012 | Klefenz |
| 8,174,570 B2 | 5/2012 | Yoneyama et al. |
| 8,233,670 B2 | 7/2012 | Moed et al. |
| 8,340,420 B2 | 12/2012 | Smith et al. |
| 8,346,706 B2 | 1/2013 | Groitzsch et al. |
| 8,370,755 B2 | 2/2013 | Buecker et al. |
| 8,379,014 B2 | 2/2013 | Wiedemann et al. |
| 8,391,612 B2 | 3/2013 | Natroshvili et al. |
| 8,396,295 B2 | 3/2013 | Gao et al. |
| 8,452,524 B2 | 5/2013 | Groitzsch et al. |
| 8,731,244 B2 | 5/2014 | Wu |
| 8,872,918 B2 | 10/2014 | Kroekel |
| 8,953,842 B2 | 2/2015 | Zobel |
| 8,995,723 B2 | 3/2015 | Stein et al. |
| 9,160,993 B1 | 10/2015 | Lish et al. |
| 2003/0059088 A1* | 3/2003 | Culp et al. .............. 382/104 |
| 2003/0202683 A1 | 10/2003 | Ma et al. |
| 2005/0086051 A1 | 4/2005 | Brulle-Drews |
| 2005/0111698 A1 | 5/2005 | Kawai |
| 2005/0232469 A1 | 10/2005 | Schofield et al. |
| 2006/0034484 A1 | 2/2006 | Bahlmann et al. |
| 2006/0098877 A1 | 5/2006 | Barnes et al. |
| 2007/0081739 A1 | 4/2007 | Wilbrink et al. |
| 2008/0107345 A1 | 5/2008 | Melikian |
| 2008/0137908 A1* | 6/2008 | Stein et al. .............. 382/103 |
| 2008/0199050 A1 | 8/2008 | Koitabashi |
| 2009/0074249 A1 | 3/2009 | Moed et al. |
| 2009/0143974 A1* | 6/2009 | Adachi et al. ........... 701/200 |
| 2009/0312888 A1* | 12/2009 | Sickert et al. ............... 701/1 |
| 2010/0198488 A1* | 8/2010 | Groitzsch et al. ........ 701/117 |
| 2010/0328316 A1 | 12/2010 | Stroila et al. |
| 2011/0157659 A1 | 6/2011 | Zenju |
| 2012/0128210 A1 | 5/2012 | Zobel |
| 2013/0011016 A1 | 1/2013 | Haas et al. |
| 2013/0058534 A1 | 3/2013 | Zobel |
| 2014/0119605 A1 | 5/2014 | Zobel |

FOREIGN PATENT DOCUMENTS

| | | |
|---|---|---|
| DE | 102005017541 | 10/2006 |
| DE | 102005062154 | 7/2007 |
| DE | 102006053289 | 5/2008 |
| DE | 102008057675 | 7/2009 |
| DE | 102008057675 A1 * | 7/2009 |
| DE | 102012212091 | 1/2013 |
| DE | 102011109387 | 2/2013 |
| EP | 0 149 457 | 7/1985 |
| EP | 1 503 354 | 2/2005 |
| EP | 1 508 889 | 2/2005 |
| EP | 1508889 A2 * | 2/2005 |
| EP | 2 026 313 | 2/2009 |
| EP | 2026313 A1 * | 2/2009 |
| EP | 2 048 597 | 4/2009 |
| EP | 2 103 984 | 9/2009 |
| JP | 2006-031618 A | 2/2006 |
| JP | 2007-263629 A | 10/2007 |
| JP | 2008-176357 A | 7/2008 |
| JP | 2010-282278 A | 12/2010 |
| JP | 2011-135513 A | 7/2011 |
| WO | WO 91/17518 | 11/1991 |
| WO | WO 2008/135604 | 11/2008 |
| WO | WO 2008/145545 | 12/2008 |
| WO | WO 2009/135460 | 11/2009 |
| WO | WO 2013/017125 | 2/2013 |
| WO | WO 2015/048954 | 4/2015 |

OTHER PUBLICATIONS

PCT Examiner Agnès Wittmann-Regis, PCT International Preliminary Report on Patentability including English Translation of PCT Written Opinion of the International Searching Authority for International Application PCT/DE2012/100208, issued Feb. 4, 2014, 7 pages, International Bureau of WIPO, Geneva, Switzerland.

German Examiner Clemens Hauber, German Search Report for German Application No. 10 2011 109 387.0, dated Sep. 9, 2011, 5 pages, Muenchen, Germany, with English translation, 5 pages.

English translation of DE 10 2008 057 675 A1.

Wang, Yongping et al., National University of Defense Technology, ChangSha, China, "A Method of Fast and Robust for Traffic Sign Recognition", Fifth International Conference on Image and Graphics, Sep. 20, 2009, IEEE, NJ, USA, XP031652742, pp. 891 to 895.

Priese, Lutz et al., University of Koblenz-Landau, Koblenz, Germany, "Ideogram Identification in a Realtime Traffic Sign Recognition System", Intelligent Vehicles '95 Symposium, Sep. 25, 1995, Michigan, USA; IEEE, NY, USA, XP010194135, pp. 310 to 314.

Hoessler, Helene et al., "Classifier Training Based on Synthetically Generated Samples", 5th International Conference on Computer Vision Systems, Mar. 21, 2007, Applied Computer Science Group, Bielefeld University, Germany, XP002510914, pp. 1 to 10.

X. W. Gao et al., "Recognition of traffic signs based on their colour and shape features extracted using human vision models", Journal of Visual Communication and Image Representation, vol. 17, Issue 4, Aug. 2006, pp. 675 to 685.

Taeg Sang Cho et al., "Blur Kernel Estimation Using the Radon Transform", IEEE Conference on Computer Vision and Pattern Recognition (CVPR), pp. 241 to 248, 2011.

Michal Irani et al., "Improving Resolution by Image Registration", CCGIP: Graphical Models and Image Processing, vol. 53, No. 3, 1991, pp. 231 to 239.

Céline Mancas-Thillou et al., "An Introduction to Super-Resolution Text", In: Chaudhuri, Bidyut B.: "Digital Document Processing, Major Directions and Recent Advances", 2007, London, GB, XP002732930, pp. 305 to 327.

Hak An Jung et al., "Traffic Sign Detection by Dominant Color Transform and Symbol Recognition by Circular Shift of Distributions on Concentric Circles", Proceedings of ITC-CSCC, Jan. 1, 1997, Okinawa, Japan, XP055154657, pp. 287 to 290.

Johannes Brauers et al., "Direct PSF Estimation Using a Random Noise Target", Institute of Imaging and Computer Vision, RWTH Aachen University, vol. 7537, Jan. 17, 2010, Aachen, Germany, XP055154644, pp. B-1 to B-10.

Xing Yu Qi et al., "Motion Deblurring for Optical Character Recognition", Eights International Proceedings on Document Analysis and Recognition, IEEE, School of Computing, National University of Singapore, Aug. 31, 2005, Singapore, XP010877977, pp. 389 to 393.

English translation of Japanese Office Action in Japanese Patent Application No. 2014-523204, mailed Mar. 16, 2016, 3 pages.

\* cited by examiner a b c

METHOD FOR RECOGNIZING TRAFFIC SIGNS

FIELD OF THE INVENTION

The invention relates to a method for the recognition of traffic signs that at least include one main sign and one assigned additional sign, and to a respective device.

BACKGROUND INFORMATION

Modern driver assistance systems are increasingly equipped with an electronic traffic sign recognition system, for example to warn the driver when the vehicle exceeds the allowed speed limit. A camera records the area in front of the vehicle and provides respective image data to an image evaluation device, which analyzes and classifies the data using an algorithm to identify traffic signs from it. Such a method is known, for example, from DE 198 52 631 A1. The information from traffic signs identified in this way can then be fed into a driver assistance feature, e.g. as indication of the currently allowed speed limit on the instrument cluster of the vehicle.

Traffic signs are often equipped with additional signs that qualify the meaning of the main sign or restrict it to specific situations.

WO 2008/145545 A1 discloses a method for identifying traffic-relevant information in which the data from a camera sensor and map data of a navigation system are interpreted. Additional signs can be taken into account if their content is included in the map data of the navigation system.

DE 10 2008 057 675 A1 describes a method in which, after identifying a traffic sign, the system looks for an additional sign assigned to the traffic sign at predefined positions (relative to the identified traffic sign). The additional sign is classified by comparison with stored depictions of additional signs, e.g. using a radial basis function.

The disadvantage of this method is that there is any number of variants for time-limiting additional signs, which would either all have to be stored or the driver only receives the additional information that the "traffic sign applies at limited times" because the content information of the additional sign cannot be recognized.

Since such traffic sign recognition systems treat additional signs purely as pictograms, such additional signs are viewed and classified as a whole, that is, as an image pattern. This means that all "time information" falls into one and the same class that cannot be further differentiated without obtaining additional knowledge, e.g. from a navigation system.

SUMMARY OF THE INVENTION

It is an object of an embodiment of this invention to state a method that allows fast and reliable recognition of additional signs assigned to traffic signs and overcomes the disadvantages of the prior art as mentioned above.

This object can be achieved by the features of methods according to embodiments of the invention set forth herein.

A method for recognizing traffic signs according to an embodiment of the invention comprises the following steps:

A camera records at least one image of the vehicle environment.

The presence and class of one or several main traffic signs is recognized from the data of the image recorded by the camera.

The presence of one or several additional sign(s) assigned to the main sign(s) is recognized.

The additional sign(s) is/are classified to the extent possible using a pattern recognition method. The system can, for example, recognize that the additional sign contains a distance (in meters or kilometers) but the pattern recognition method does not recognize the value of that distance.

If classification was not or not completely possible using the pattern recognition method, a text recognition method reads and interprets the text of the additional sign to determine its information content. Reading in this context means that the method identifies individual letters or numbers, and interpreting means that the method captures the meaning or meaningful content of this text. Both steps together could optionally be called reading or interpreting.

An embodiment of the invention is based on the rationale that additional signs that have a (partially) varying or variable content, i.e. a content that is not the same for all signs of this class of signs, are subjected to an automatic machine interpretation process of this variable content because such variable content typically is textual information. Varying or variable texts include, in particular, information on time, distance, and weight. These may vary for various additional signs.

In a variant of the method described, a decision is made after the first three steps (see above) if the present additional sign includes varying text. This decision can for example be made based on an advance classification in which additional knowledge can be taken into account. Additional knowledge can mean, for example, knowledge that particular main signs are frequently combined with particular additional signs. For example, the "Construction" sign on freeways is often associated with distance information on the assigned additional sign, e.g. "in 2 km". If a decision is made that the additional sign includes varying text, the text of the additional sign is read and interpreted using a text recognition method. Furthermore, a decision is made if the additional sign includes other information. This can in particular be other information next to varying text or other information on a sign that does not contain varying text. If other information is present, this other information is interpreted using a pattern recognition method. If no other information is present, no pattern recognition is performed, since there is only varying text on the additional sign that is read by the text recognition feature.

The order of these two steps, in each of which a decision is made, is not predetermined. For example, while performing pattern recognition, such a system could detect that varying text is present and this varying text could then be passed on to text recognition.

Both methods according to the invention have the advantage that traffic signs that differ by text content from other, e.g. learned traffic signs, can be recognized reliably and completely. Recognition of the text content is also independent of the various meanings of traffic signs in different countries and even works for different fonts/font sizes on additional signs. Recognition is therefore highly flexible.

In an advantageous embodiment of the invention a relevance assessment step is added in which the recognized text is compared with situational information such as time of day, weekday, distance the vehicle has traveled since passing the traffic sign and additional sign that were recognized, weight of the vehicle, whether the road is wet, outside temperature, position of the lane the vehicle is in, activation of the turn signal and/or a recommended turn from an active route planning feature. In this way, the relevance of the main sign to which the additional sign is assigned can be determined for the current driving situation.

The main sign is preferably classified as not relevant based on the relevance assessment if the situational information does not fall within the scope of the text recognized on the assigned additional sign. If a speed limit for reasons of noise protection applies only from 8 p.m. to 6 a.m., it can be ignored for the current time of 2:35 p.m. because it is not currently relevant.

In a preferred embodiment of the invention, at least one main sign is classified as relevant if the situational information falls within the scope of the text recognized on the assigned additional sign.

According to a preferred embodiment, the system checks if the relevance assessment will remain constant or not for an expected change in situational information. If the respective speed limit sign was passed at 7:59 p.m., a change in situational information that will result in a changed relevance assessment can be expected for 8 p.m. In this case, it is preferred to repeat the relevance assessment when the situational information changes.

The situational information may preferably include a current vehicle speed, which can be derived in a known way from a series of images taken by the same camera. The distance the vehicle has traveled since passing the recognized traffic sign with additional sign can be determined on the basis of the vehicle speed data. This allows an evaluation of the relevance of traffic signs which apply after or within a specific distance. Recognition of a stop sign with the additional sign "in 200 m" could also advantageously be used in that the traffic sign recognition feature actively "searches" for a stop sign in this range.

In a preferred embodiment, a consistency check of the text found in the two additional signs is performed when similar signs are detected on both sides of the road. If the main signs were classified as identical, it is unlikely that the content of the additional signs differs. A decision which recognized content is correct can be made depending on the reliability of the recognition (pattern and/or text) or by merging the two recognized messages and subjecting them to a plausibility check.

It is preferred that further information from a digital map, a positioning device and/or other vehicle sensors, such as a rain sensor, driving dynamics sensor, radar or LIDAR, is taken into account.

Another subject matter of the invention is a device for recognizing traffic signs that comprises a camera for recording at least one image of a vehicle environment, an image evaluating unit, and a unit for relevance assessment. The image evaluation unit can recognize the presence and class of one or several main signs and the presence of one or several additional signs assigned to the recognized main sign(s) from the image data recorded. The image evaluation unit comprises a pattern recognition unit and a text recognition unit for this purpose. The text recognition unit can in particular be used to read and interpret variable text information on the additional sign. The unit for relevance assessment compares the recognized text with situational information to determine the relevance of the main sign for a current driving situation.

BRIEF DESCRIPTION OF THE DRAWINGS

Other advantages of the invention follow from the description and the figures. Embodiments are simplified in the figures and explained in more detail in the description below.

DETAILED DESCRIPTION OF EXAMPLE EMBODIMENTS OF THE INVENTION

Figure 1:
FIG. 1: Examples of additional signs with pictograms

FIG. 1 shows two additional signs with a pictogram, that is, "hazard point direction symbol pointing right" and "risk of unexpected ice on the road". These additional signs can be classified using pattern recognition. This also applies to additional signs that comprise invariable text elements such as "slick surfaces", "road damage", "when wet" (not shown). The latter could also be completely classified using pattern recognition because the letters are fixed and can therefore be recognized as patterns.

Figure 2:
FIGS. 2a, 2b and 2c: Examples of additional signs with variable text
Figure 2:
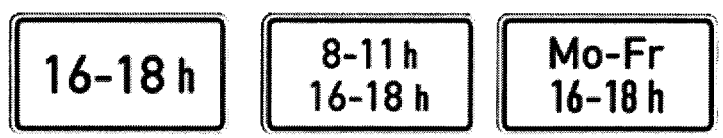
Figure 2:
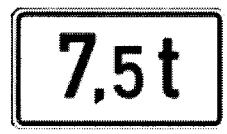

FIGS. 2a, 2b and 2c however show additional signs with variable text content, namely, for example: Distance information (FIG. 2a), time of day/weekday information (FIG. 2b), and weight information (FIG. 2c). A large number of different values or combinations, e.g. of weekdays and times of day, is possible here. Such additional signs can therefore typically not be completely classified using a pattern recognition method. A partial classification may, for example, reveal that the additional signs in FIG. 2b all contain "time information". A text recognition method according to the invention provides the information that the time specified in the left-hand additional sign of FIG. 2b is 16-18 hrs (4-6 p.m.).

Figure 3:
FIG. 3: Additional signs with pictograms and variable text

The additional signs in FIG. 3 contain a pictogram-like symbol combined with variable text. While the additional signs on the left and in the center of FIG. 3 specify the distance over which the associated main sign applies, i.e. is relevant, the additional sign on the right specifies the period of time for which parking is allowed when a parking disk is used. The pattern recognition feature will recognize, for example, the up arrows (left, center) or the parking disk (right). The text recognition feature determines the respective scope of validity (800 m, 3 km, 2 hours). In this way, the traffic sign recognition obtains the complete information of the additional sign and can check its relevance.

If, for example, the left additional sign from FIG. 3 is completely recognized using a traffic sign recognition system according to the invention, that is, is classified as "applicable for 800 m" in that the pictogram-like arrows are recognized by the pattern recognition feature and the variable text "800 m" is read and interpreted by the text recognition feature. The traffic sign recognition system therefore has the information that the main sign(s) to which this additional sign is assigned applies/apply for a distance of 800 meters from the position of the main and additional signs.

This information can now be subjected to a relevance assessment and compared to a piece of situational information, namely the distance the vehicle has traveled since passing the recognized traffic sign and additional sign. The relevance assessment is repeated because it is clear that this distance will change as long as the vehicle keeps moving. As long as this distance is smaller than 800 meters, the main sign is relevant and can be displayed to the driver of the vehicle. As soon as a distance of 800 m or more has been traveled, the relevance assessment will reveal that the main sign is no longer relevant, and it will no longer be displayed, for example.

The invention claimed is:

1. A method of traffic sign recognition in a driver assistance system of a motor vehicle, said method comprising the step:

a) using a camera, recording image data of at least one image of a vehicle environment outside of the motor vehicle driving along a road;

and further comprising the following steps in an automatic machine interpretation process performed by said driver assistance system:

b) from the image data, recognizing the presence and class of at least one main sign present in the vehicle environment;

c) from the image data, recognizing the presence of at least one additional sign assigned to the main sign;

d) classifying the additional sign using a pattern recognition method to an extent possible;

e) reading and interpreting and thereby recognizing text of the additional sign using a text recognition method; and f) in a relevance assessment unit of the driver assistance system, automatically assessing a relevance of the main sign in an automatic machine-based relevance assessment, in which the recognized text of the additional sign is compared to situational information regarding the motor vehicle, a current operation of the motor vehicle, or a condition of the vehicle environment.

2. The method according to claim 1, wherein the main sign is assessed as not relevant based on the relevance assessment if the situational information does not fall within a scope of the recognized text of the additional sign.

3. The method according to claim 2, further comprising performing a check whether the relevance assessment for an expected change in situational information will remain constant or not, and if not, then repeating the relevance assessment when the situational information changes.

4. The method according to claim 1, wherein the at least one additional sign comprises two additional signs which comprise two similar signs detected on two opposite sides of the road, and further comprising performing a consistency check of respective text found on the two additional signs.

5. The method according to claim 1, further comprising taking into account, for the relevance assessment, other information from a digital map, a positioning device and/or other vehicle sensors.

6. A method of traffic sign recognition in a driver assistance system of a motor vehicle, said method comprising the step:

a) using a camera, recording image data of at least one image of a vehicle environment outside of the motor vehicle driving along a road;

and further comprising the following steps in an automatic machine interpretation process performed by said driver assistance system:

b) from the image data, recognizing the presence and class of at least one main sign present in the vehicle environment;

c) from the image data, recognizing the presence of at least one additional sign assigned to the main sign, wherein the additional sign includes text;

d) reading and interpreting and thereby recognizing the text of the additional sign using a text recognition method;

e) deciding whether the additional sign includes other information, and if so, then classifying the other information using a pattern recognition method; and f) in a relevance assessment unit of the driver assistance system, automatically assessing a relevance of the main sign in an automatic machine-based relevance assessment, in which the recognized text of the additional sign is compared to situational information regarding the motor vehicle, a current operation of the motor vehicle, or a condition of the vehicle environment.

7. The method according to claim 6, wherein the main sign is assessed as not relevant based on the relevance assessment if the situational information does not fall within a scope of the recognized text of the additional sign.

8. The method according to claim 7, further comprising performing a check whether the relevance assessment for an expected change in situational information will remain constant or not, and if not, then repeating the relevance assessment when the situational information changes.

9. The method according to claim 6, wherein the at least one additional sign comprises two additional signs which comprise two similar signs detected on two opposite sides of the road, and further comprising performing a consistency check of respective text found on the two additional signs.

10. The method according to claim 6, further comprising taking into account, for the relevance assessment, other information from a digital map, a positioning device and/or other vehicle sensors.

11. A method of traffic sign recognition in a driver assistance system of a motor vehicle driving along a road, wherein the driver assistance system includes a camera, said method comprising the following steps performed in the driver assistance system:

a) with the camera, recording image data of at least one image of a vehicle environment outside of the vehicle that includes a main sign and an auxiliary sign associated with the main sign;

b) evaluating the image data and thereby recognizing a presence of the main sign and classifying main sign information of the main sign;

c) evaluating the image data and thereby recognizing a presence of the auxiliary sign;

d) performing pattern recognition on the image data and thereby recognizing and classifying any available pattern information of the auxiliary sign;

e) performing text recognition on the image data and thereby reading and interpreting textual information of the auxiliary sign;

f) obtaining situational information regarding the motor vehicle, a current operation of the motor vehicle, or a condition of the vehicle environment;

g) automatically assessing a relevance of the main sign by comparing the situational information with the interpreted textual information of the auxiliary sign and with any available classified pattern information of the auxiliary sign, and thereby determining whether that the main sign is relevant only when the situational information falls within a scope of the interpreted textual information of the auxiliary sign and the available classified pattern information of the auxiliary sign; and h) in response to the step g) having determined that the main sign is relevant, activating a driver assistance feature of the driver assistance system based on the classified main sign information of the main sign.

12. The method according to claim 11, wherein the textual information of the auxiliary sign includes at least one of letters and numbers.

13. The method according to claim 11, wherein the pattern information of the auxiliary sign includes at least one non-textual symbol.

14. The method according to claim 11, wherein the pattern information of the auxiliary sign includes letters or numbers matching a fixed pre-specified pattern.

15. The method according to claim 11, wherein the driver assistance feature comprises searching for an upcoming further sign in subsequent image data recorded by the camera at a subsequent time, in response to the situational information at the subsequent time falling within the scope of the interpreted textual information and the available classified pattern information of the auxiliary sign at a previous time.

16. The method according to claim 11, wherein, if the situational information changes over time, then at a subsequent time when the situational information has changed, again comparing and determining whether the changed situational information at the subsequent time falls within the scope of the interpreted textual information and the available classified pattern information of the auxiliary sign from a previous time.

17. The method according to claim 11, wherein the situational information comprises a distance the vehicle has traveled since passing the main sign and the auxiliary sign.

18. The method according to claim 11, wherein the situational information comprises at least one of an outside temperature and an indication whether the road is wet.

19. The method according to claim 11, wherein the situational information comprises at least one of an indication whether a turn signal of the vehicle is activated and a position of a lane of the road in which the vehicle is traveling.

* * * * *

UNITED STATES PATENT AND TRADEMARK OFFICE
CERTIFICATE OF CORRECTION

| | | |
|---|---|---|
| PATENT NO. | : 9,436,879 B2 | Page 1 of 1 |
| APPLICATION NO. | : 14/126098 | |
| DATED | : September 6, 2016 | |
| INVENTOR(S) | : Matthias Zobel | |

It is certified that error appears in the above-identified patent and that said Letters Patent is hereby corrected as shown below:

In the Claims

<u>Column 6,</u>
Line 44, after "determining", delete "whether".

Signed and Sealed this
Eighth Day of August, 2017

Joseph Matal
*Performing the Functions and Duties of the*
*Under Secretary of Commerce for Intellectual Property and*
*Director of the United States Patent and Trademark Office*